United States Patent [19]

Jansen et al.

[11] 4,222,102

[45] Sep. 9, 1980

[54] DATA BUFFER MEMORY OF THE "FIRST-IN, FIRST-OUT" TYPE, COMPRISING A VARIABLE INPUT AND A VARIABLE OUTPUT

[75] Inventors: Pierre G. Jansen; Jozef L. W. Kessels; Benny L. A. Waumans, all of Eindhoven, Netherlands

[73] Assignee: U.S. Philips Corporation, New York, N.Y.

[21] Appl. No.: 963,547

[22] Filed: Nov. 24, 1978

[30] Foreign Application Priority Data

Dec. 12, 1977 [NL] Netherlands .................... 7713706

[51] Int. Cl.² ............................................. G11C 13/00
[52] U.S. Cl. ..................................... 364/200; 365/73; 365/221; 365/239
[58] Field of Search ................... 365/49, 73, 221, 239, 365/200

[56] References Cited

U.S. PATENT DOCUMENTS 3,629,857   12/1971   Faber ................................ 364/200

*Primary Examiner*—Terrell W. Fears
*Attorney, Agent, or Firm*—Thomas A. Briody; Jack Oisher; James J. Cannon, Jr.

[57] ABSTRACT

A data buffer memory of the "first-in, first-out" type, having an input bus by which data are applied to the buffer and an output bus by which data are taken up from the buffer. The buffer includes logic means whereby a variable input location and a variable output location can be selected. The logic means are provided for each section of the buffer and use status signals in co-operation with signals applied from outside the buffer, to determine where data are to be written in the buffer and where data are to be read from the buffer.

8 Claims, 8 Drawing Figures

DATA BUFFER MEMORY OF THE "FIRST-IN, FIRST-OUT" TYPE, COMPRISING A VARIABLE INPUT AND A VARIABLE OUTPUT

BACKGROUND OF THE INVENTION

1. Field of the Invention

The invention relates to a data buffer memory of the "first-in, first-out" type, having logic means for ensuring that an input for data to be written is situated as near as possible to an output for data to be read, depending on the filling of the buffer, thus forming an uninterrupted content of the buffer, furthermore having an input bus for transporting data to the buffer, notably to an input of a register thereof assigned for this purpose, and an output bus via which data are read from the buffer, notably from a register assigned for this purpose.

2. Description of the Prior Art

A variety of data buffer memories of the described "first-in, first-out" type are known to serve as buffer devices in digital data processing and communication systems at locations where differences occur in the rate in which input data is supplied and the rate in which output data is consumed. A number of the known buffers are characterized by simplicity of construction, notably by a substantially repetitive nature of the various sections of the buffer. An example in this respect is formed by the buffer described in U.S. Pat. No. 3,745,535. A problem with buffers of this kind is that, if the capacity of the buffer is n sections, a message which is applied to an empty buffer appears on the output thereof only after n clock pulse cycles. Particularly if n is large (for example, 32) this may give rise to unacceptable delays in practice. These buffers are thus characterized by a so-called fixed input and a fixed output.

As has been mentioned above, the buffer in accordance with the present invention is of the so-called variable input/variable output type, based on the fact that use is made of an input bus and an output bus. Buffer memories of this kind, comprising a variable input and a variable output, are also known from British Pat. No. 1,497,774. Therein, a variable input location and a variable output location of the buffer can be activated by means of counting devices and decoding selection networks coupled thereto. The advantage of such an arrangement comprising a variable input and a variable output is that the data need not be transported in order to reach the output. Particularly in cases where the buffer is empty or almost empty, delays are thus prevented. However, a major problem of the latter buffer devices is that the complexity of control increases as the number of sections of a buffer is larger. Counters having a high counting capacity and complex decoding selection networks for the inputs and outputs to be assigned, or other additional steps are then required. Moreover, the linking of a number of small buffers in order to form one large buffer is not possible without additional complications.

SUMMARY OF THE INVENTION

The invention has for its object to provide a buffer memory of the described type which has a simple set-up and which also involves a short delay time for the data. In order to achieve this object, the data buffer memory in accordance with the invention includes logic means provided for section of the buffer, the logic means being of a type such that the following signals can be generated in a buffer comprising n registers (0, 1 . . . n−1):

(a) $cop(i) = creq \cdot \overline{s(i)} \cdot s(i+1)$, which determines the selection of register (i) in the buffer in which, in reaction to a request (creq) from outside the buffer, data are taken from the input bus, subject to the condition that register (i) is empty (status $\overline{s(i)}$ is fulfilled and that the next register (i+1) is full (status s(i+1) is fulfilled);

(b) selout (i) which represents, on the basis of the longest filled state of a register (i), a signal for the selection of register (i) wherefrom data are taken by the output bus; the signal selout (i) also serving to form a signal whereby the status of the register (i) is updated, in reaction to an acknowledge signal (ers) applied from outside the buffer (s(i):=0), to indicate that the register (i) becomes empty);

(c)

$$e = \prod_{i=0}^{n-1} \overline{s(i)}$$

which is a signal indicating that all registers are empty; this means that no signal cop(i) can be generated; however, by the selection of a location j for which the signal for the selection of the register (j) is generated, subject to the condition $cop(j) = creq \cdot \overline{s(j)} \cdot s(j+1) + e$, the result is that if the condition e occurs, the register (i) is still selected (notably j=0).

A fully repetitious character of the sections is obtained by means of said logic means which are provided for each section of the buffer. The linking of a plurality of buffers is possible without complications. Moreover, the logic means for each stage have a simple set-up. Control is possible by means of a comparatively small number of logic elements for each section. As a result of such control, the location from which data are read from the buffer is situated as near as possible to the location in which data are written in the buffer. Thus, a minimum delay time for the data through the buffer is ensured.

Generally, said statuses occurring in the logic means are stored in bistable memory elements. Because situations then occur in which a bistable memory element reads itself, these memory elements must be of a type, in order to prevent uncertain situations, such that the reading of the content by the memory element itself cannot impose problems. Bistable memory elements which are suitable in this respect are the so-called edge-controlled flipflops. In that case, after a given period of time (set-up time) certainty exists as regards a newly arising situation. Bistable memory elements which also satisfy said requirement are the so-called master/slave flipflops. However, in this respect it should be taken into account that their operation involves at least two clock cycles. A data buffer memory in accordance with the invention in which flipflops of this kind are used is characterized in that said logic means for each section of the buffer include two bistable memory elements which can be operated in a first and a second clock pulse phase, the first bistable elements serving for updating an auxiliary status h(i) of a register (i), while the second bistable elements serve for updating the status s(i) of a register (i), said elements also defining the signal selout (i) = $\overline{h(i)} \cdot s(i)$ which unambiguously selects the register (i) which qualifies to be read out to the output bus, said bistable elements ensuring, regardless of whether or not the buffer is completely filled, that the status becomes $h(i):=0$ upon appearance of the signal selout (i) in a first clock pulse phase, provided that the condition $s(i) \cdot \overline{s(i+1)}$ is satisfied, while in a second clock pulse phase the status becomes $s(i):=0$ only if the condition $\overline{h(i)} \cdot ers$ is satisfied. Therefore, said two bistable memory elements may substantially be a master/slave flipflop. The advantage of the use of these two memory elements for each logic means for each section of the buffer is that, even if the buffer is completely filled, there are no problems in determining where the output location and where the input location of the buffer are situated. In that case, one of the bistable memory elements of the logic means of the section where the condition for generating the signal "selout" is satisfied, has an unambiguous logic 1 value (s(i)=1), while the other memory element has an unambiguous logic 0 value (h(i)=0).

In order to avoid the problem of determining the output location or the input location of the buffer in the case of a completely filled buffer, it is alternatively possible to prevent the buffer from being completely filled. In order to achieve this object, a preferred embodiment is characterized in that:

(a) said logic means and further logic means for each section generate the signal $cop(i) = creq \cdot \overline{s(i)} \cdot s(i+1)$ only if the condition $\overline{s(i-1)}$ is also satisfied, complete filling of the buffer thus being prevented (there is at least one empty register);

(b) selout (i) appears subject to the condition $s(i) \cdot \overline{s(i+1)}$, which is, on the basis of the presence of at least one empty register, an unambiguous selection for register (i) to be read out to the output bus, and that the signal selout (i)·ers appears as the signal whereby the status of register (i) can be updated: $s(i):=0$ (register (i) becomes empty);

(c) in case all registers are empty, nevertheless a register (j) is selectable by $cop(j) = creq \cdot \overline{s(j-1)} \cdot s(-j) \cdot s(j+1) + e)$, in agreement with the additional condition mentioned sub (a). In data processing devices, it may be important that the buffer memory supplies an acknowledge signal when data have been taken up in the buffer. To this end, a further embodiment of the buffer memory is characterized in that signal "cack" can be generated, subject to the condition $$\bigcup_{i=0}^{n-1} cop(i) = 1,$$

appearing if the signal cop(i) appears in one of the logic means, said signal being an acknowledgement to the outside of the buffer that data have been stored in one of the registers (i).

A still further embodiment of the buffer memory is characterized in that a status signal $$SFI = \bigcup_{i=0}^{n-1} s(i)$$

appears on an output of the buffer to indicate that data are present in at least one of the registers of the buffer.

As a result of the use of said statuses for each section, preferably being updated in bistable memory elements as part of the logic means, a simple arrangement is achieved which is suitable for integration purposes. As a result of the modular construction, it is possible to construct the relevant register and the associated logic means as a solid state integrated circuit at least for each section of the data buffer memory. The buffer may also consist of at least one group of registers and at least one group of logic means for each section of the buffer, said groups being solid state integrated circuits. Said modularity also means that a plurality of buffer memories can be readily linked in order to achieve buffer lengths as desired.

BRIEF DESCRIPTION OF THE DRAWINGS

The present invention will now be described by way of example with reference to the accompanying diagrammatic drawings. The drawings show feasible embodiments to which the invention, however, is not restricted.

DESCRIPTION OF THE PREFERRED EMBODIMENTS

Figure 1:
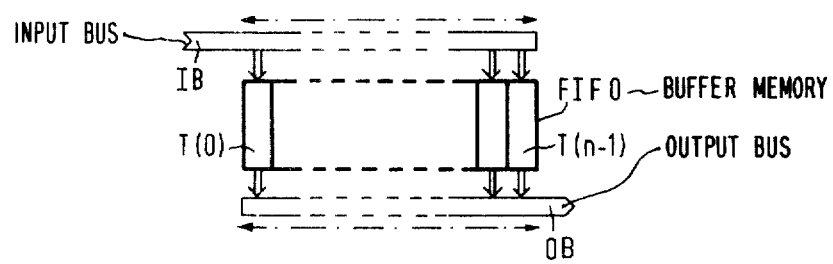
FIG. 1 shows a circuit diagram of a "first-in, first-out" buffer memory, having a variable input and a variable output.

FIG. 1 shows a simplified diagram of a "first-in, first-out" buffer memory, comprising a variable input and a variable output. The buffer is denoted by the reference FIFO. IB forms the input bus via which data are applied to the buffer, notably to inputs of a register of a section T(0), ... T(n−1) thereof assigned for this purpose. This constitutes the variable input. OB forms the output bus via which data are extracted from the buffer, notably from outputs of a register of a section T(0), ... T(n−1) thereof assigned for this purpose.

Figure 2:
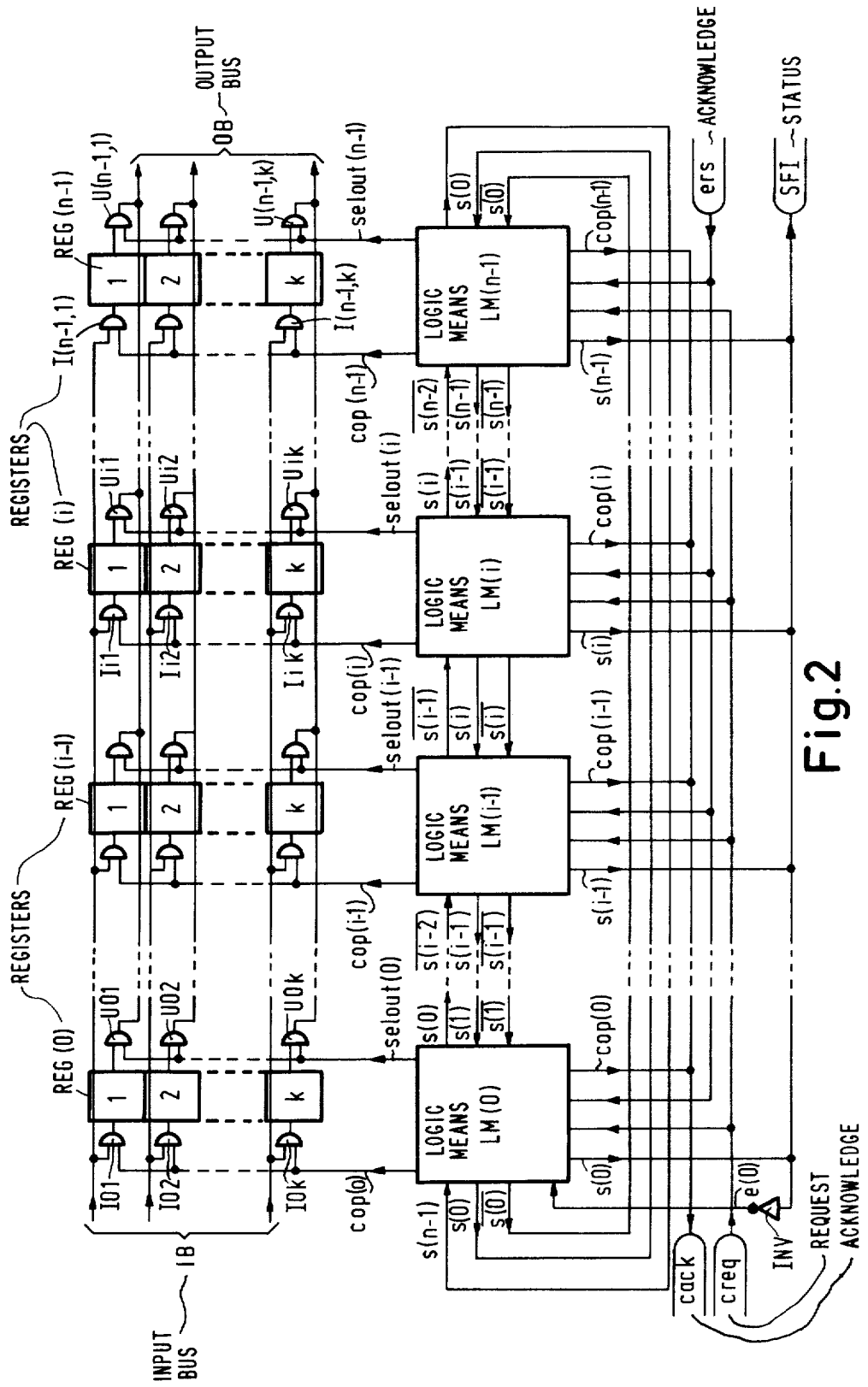
FIG. 2 shows a block diagram of the buffer memory in accordance with the invention.

FIG. 2 shows the block diagram of an example of a buffer memory in accordance with the invention. The memory consists of a register section, comprising the registers REG(0), ... REG(i−1), REG(i), ... REG(n−1). These registers serve for the storage of the applied data. Each register REG(i) may consist of one or more stages 1, 2, ... k. This indicates the possibility of chosing the width of the data path at random: 1 bit of data path requires one stage (1) per REG(i) etc. The input bus IB is shown to extend across the registers in FIG. 2. The inputs (of each stage 1, 2, ... k) of each register REG(i) are connected to the bus IB. AND-function gates are used for this purpose: IO1, IO2, ... IOk for the relevant register stages 1, 2, ... k of REG(0), ... Ii1, Ii2, ... Iik for the relevant register stages 1, 2, ... k of REG(i) etc. The choice as regards which of the registers REG(i) is connected to the input bus IB is determined by the logic means LM(0), ... LM(i−1), ... LM(n−1) which are provided for each section of the buffer. A signal cop(0), ... cop(i) ... cop(n−1) is generated in said logic means and is applied to said AND-function gates, IO1, IO2, ... IOk, ... or Ii1, ... Iik, ... or I(n−1,1), ... I(n−1, k). The selection of the buffer register REG(i) (i=0−)n−1)) to which the data are applied from the input bus IB is thus realized. Furthermore, the outputs (of each stage 1, 2, ... k) of each register REG(i) are connected to the output bus OB. AND-function gates are used for this purpose: UO1, UO2, ... UOk for the relevant stages 1, 2, ... k of REG(0); ... Ui1, Ui2, ... Uik for the relevant stages 1, 2, ... k of REG(i), etc. The choice as regards which of the registers REG(i) is connected to the output bus OB is determined by the logic means LM(0), ... LM(i), ... LM(n−1) which are provided for each section as stated above. A signal selout(0), ... selout(i), ... selout(n−1) is generated by these logic means and is applied to said AND-function gates UO1, ... UOk, ... or Ui1, ... Uik, ... or U(n−1,1), ... U(n−1, k). The selection of the one register REG(i) (i=0−(n−1)) from which data are applied to the output bus OB of the buffer is thus realized. The buffer furthermore consists of a control section, comprising said logic means LM(i) per section of the buffer. The signals generated in these logic means are, in addition to the said signals cop(i) and selout(i), the status signals s(i) and the inverse thereof: $\overline{s(i)}$. These statuses indicate the full (s(i)=1) and the empty stage (s(i)=0), respectively, of a register (i). The term "empty" is to be understood to mean herein that the register does not contain valid data. Because of the variable input and output of the buffer, a fixed input location or output location of the buffer cannot be assigned. As far as the control section is concerned, the buffer is coupled end-around, which means that the last logic means LM(n−1) are connected to the first logic means LM(0), the logic means thus forming a modulo (n) connected control section. The signals "creq" and "ers," originate from outside the buffer, and the signals "cack" and "SFI" are produced by the buffer, shown in FIG. 1, and these signals have the following significance: "creq" is a request signal to inform the buffer that data are applied from outside the buffer; "ers" is an acknowledge signal which indicates that data have been received from the buffer (by the user device connected therebehind); "cack" is an acknowledge signal which appears after the storage of data in the buffer; "SFI" is a signal which indicates that data are applied on the output bus OB. Further particulars of the logic means and the associated signals will be given with reference to the FIGS. 5, 6, 7 and 8.

Figure 3:
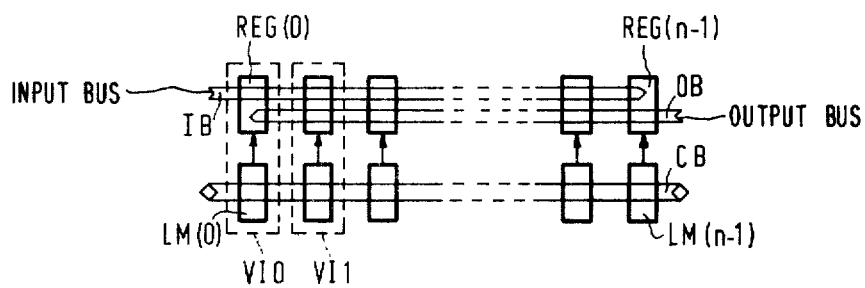
FIGS. 3 and 4 show examples of the partitioning of the buffer memory in view of construction in the form of solid state integrated circuits.
Figure 4:
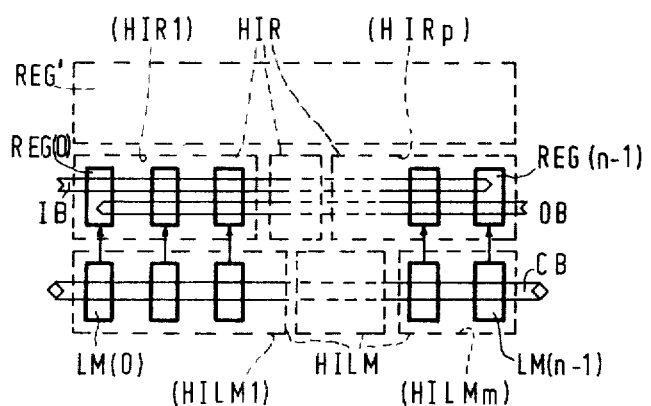

FIGS. 3 and 4 show a number of possibilities for partioning the buffer memory in view of construction in the form of solid state integrated circuits. The modularity of the buffer memory shown in FIG. 2 enables a variety of solutions: the references VI0, VI1, ... in FIG. 3 indicate that integration is possible at least for each section of the buffer: an REG(0) is combined in an IC together with the logic means LM(0). The connection between the sections and the input bus is again denoted by the references IB and OB. The connections between the logic means and the further incoming and outgoing signal lines are denoted by the reference CB in FIG. 3. Similarly, FIG. 4 shows that integration in integrated circuits is possible for each group HIR or groups HIR1, ... HIRp of registers REG(0), ... REG(n−1), or per group HILM, or groups HILM1, ... HILMm of logic means LM(0), ... LM(n−1). Obviously, construction of complete buffer memories in one solid state integrated circuit is also possible. The linking of any chosen construction is not problematic, as will be explained hereinafter on the basis of the detailed embodiments of the logic means for each section of the buffer memory.

The broken line REG' indicates that a buffer for a desired data path width can be composed by means of additional register blocks.

Figures 5, 6:
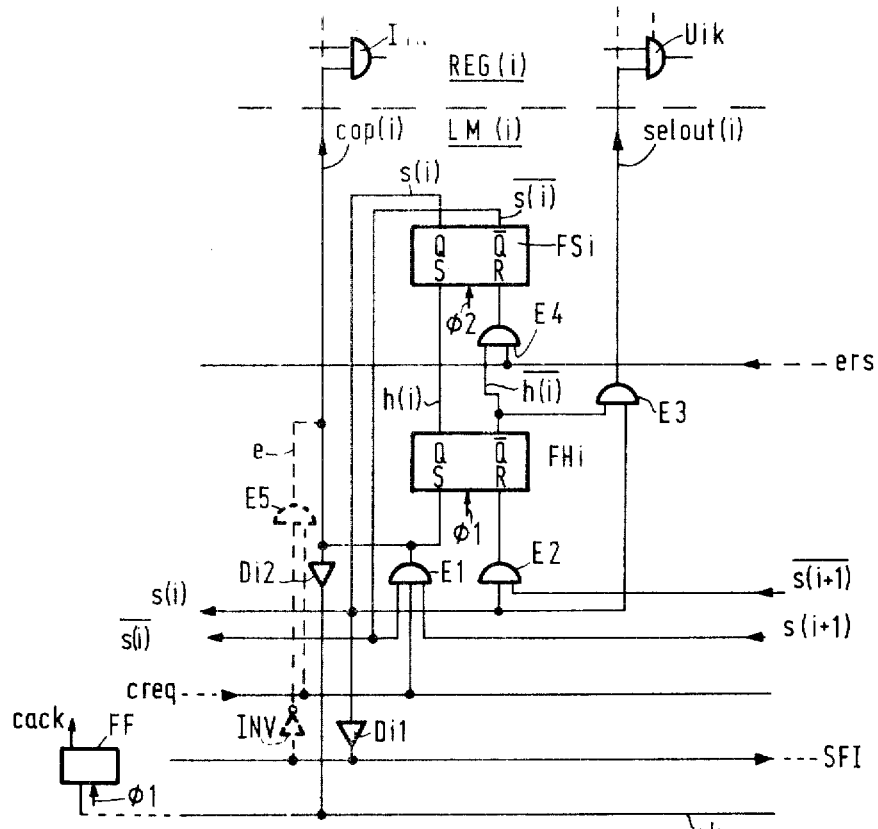
FIG. 5 shows an embodiment of the logic means of the buffer memory.
FIG. 6 shows an example of statuses and signals associated with the example shown in FIG. 5.

FIG. 5 shows an embodiment of the logic means LM(i) of a buffer section (i) for the control of a register REG(i) of this section. In this embodiment, the logic means includes two bistable memory elements FHi and FSi (master/slave arrangement) which are operated by a first clock pulse $\phi 1$ and a second clock pulse $100\ 2$, respectively. Both flipflops have a set (S) and a reset (R) input. The outputs Q and $\overline{Q}$ carry signals which indicate a status: h(i) and $\overline{h(i)}$ are so-called auxiliary status signals, while s(i) and $\overline{s(i)}$ are the status signals in the relevant logic means LM(i). The logic means furthermore include AND-function gates E1, E2, E3, E4 and drive circuits Di1 and Di2. FIG. 5 also shows an AND-function gate E5, an inverter circuit INV and also a flipflop FF (not belonging to LM(i)).

The operation of the device shown in FIG. 5 is as follows: the signal cop(i) is generated in the AND-function gate E1 if the condition cop(i)=creq·$\overline{s(i)}$·s(i+1) is satisfied. REG(i) is thus selected for taking over data from the input bus through the gates Iik, ... This takes place in reaction to the request "creq" and if the register REG(i) is empty (so $\overline{s(i)}$=1) and the following register REG(i+1) is full (so $s(i+1)$=1). This selection is also laid down in the status s(i) as follows: in the clock phase $\phi 1$, FHi is set and h(i):=1. In the clock phase $\phi 2$, FSi takes over this state, so that s(i):=1. It is thus laid down that REG(i) has been filled.

FIG. 6 shows two situations (FIGS. 6a and 6b) to illustrate, on the basis of a practical situation, what happens to the content of a buffer, that is the content of the registers REG, the content h of the bistable elements FH, and the content s of the bistable elements FS. A cross indicates that a register REG(i) has been filled, while a zero indicates that it does not contain valid data. h=1 indicates the auxiliary status "full," s=1 indicates the status "full." FIG. 6 shows where in the buffer the selection signal "cop" appears, in reaction to a signal "creq," on the basis of the condition $\overline{s(i)}$·s(i+1). This is shown at the top in FIG. 6a as well as in 6b. FIG. 6a shows the case of a partly filled buffer, in which input data are input at the left and output data are output at the right. FIG. 6b shows the case of a buffer which is completely filled except for one location. The input selection takes place at the right, while the output selection takes place at the left. (This is a situation which automatically occurs due to the circulating character of the buffer; see also the description given with reference to FIG. 2).

The output selection for reading to the output bus is effected in the AND-function gate E3. Herein, the condition selout(i)=$\overline{h(i)}$·s(i) is monitored. Where this is the case, this becomes apparent by the indication of the signal "selout" as far as the examples of FIG. 6 are concerned. As appears from FIG. 5, the selection signal selout(i) serves for opening the AND-function gates .. . Uik ..., so that the content of REG(i) is transferred to the output bus OB (see also FIG. 2). FIGS. 6a and 6b clearly illustrate what happens to the statuses in the clock phases $\phi 1$ and $\phi 2$. Upon appearance of the "cop" signal, in reaction to which a location in the buffer is filled, h:=1 and $\phi 1$ (s=0 remains); in reaction to $\phi 2$, s:=1. In this respect, see the second and the third group of signal symbols in the FIGS. 6a and 6b, respectively. When the content of the relevant register have been taken up by the surroundings, the signal "ers" will appear on the buffer in reaction to the selection signal selout. Subject to the condition $\overline{h(i)}\cdot ers=1$, determined by the AND-function gate E4, the bistable element FS(i) is reset, by its reset input R, during the clock phase $\phi 2$ (s(i):=0). See also the FIGS. 6a and 6b where this is indicated in the relevant positions: in the second group of signal symbols, "ers" is denoted as originating from outside the buffer. In the third group of signal symbols ($\phi 2$), what happens can be seen. These status transitions enable the condition $s(i)\cdot \overline{s(i+1)}$ to be satisfied in the AND-function gate E2 of FIG. 5. This is valid for the locations in FIGS. 6a and 6b for which the situation "10" for s occurs. See notably the third group of signal symbols. During the clock phase $\phi 1$, the auxiliary status h is reset by way of this condition: FIG. 5, input R of FH(i). Thus, another location where selout$=\overline{h}\cdot s=1$ is applicable has been formed.

FIG. 6a shows that the complete filling of the buffer does not impose any problems: the second group of signal symbols in FIG. 6b represents a completely filled buffer. This is because in this situation it remains possible to unambiguously assign an output location. The statuses h and s are capable, as a result of the different values thereof, of unambiguously forming "selout" as well as "cop."

In FIG. 5, the status s(i) is connected to the signal line SFI by drive circuit Di1 (for uncoupling the signal paths in order to prevent mutual influencing). If s(i)=1 for at least one status, the buffer still contains valid information in one location which is applied to the output bus. The signal SFI, thus representing an OR-function of all statuses $$s(i)\overset{n-1}{\underset{i=0}{\smile}}s(i),$$

may be used outside the buffer in order to initiate an action or to continue an action in view of the presence of data in the buffer. Similarly, the signal cop(i) of FIG. 5 is applied, via a drive circuit Di2, to a signal line ck. This signal line, by which the cop(i) is applied to a flipflop FF in an OR-function (wired-or)

$$\overset{n-1}{\underset{i=0}{\smile}}cop(i),$$

ensures during the clock phase $\phi 1$ that the signal "cack," being the acknowledge signal that data have been stored in a register REG(i), is produced in FF.

The appearance of "cack" during the clock phase $\phi 1$ enables, in the case of linking of a plurality of buffers, the "cack" signal to be used as the "ers" input signal in a preceding buffer. During $\phi 2$, the signal is then available to ensure that the status is s(n−1):=0 in the preceding buffer, after transfer of the data to the buffer coupled thereto. When the buffer is completely empty, a random input location must be chosen, because the condition $\overline{s(i)}\cdot s(i+1)=1$ is not satisfied in any location. In order to obtain an unambiguous input location even in this case, use is made of the signal SFI. If SFI=0, that is the buffer is completely empty, a signal $\overline{SFI}=1$ appears on the output of the inverter INV (see FIG. 5). This signal is applied, together with the signal "creq," to an AND-function gate E5.

Therein, in reaction to "creq" a signal e=1 is formed which in this situation produces cop(i)=1. Thus, in this example a step is taken in the logic means LM(i) for unambiguously assigning an input location in the case "buffer completely empty." Generally, said step will be taken in the first section of the buffer (and hence in LM(0)).

Figure 7:
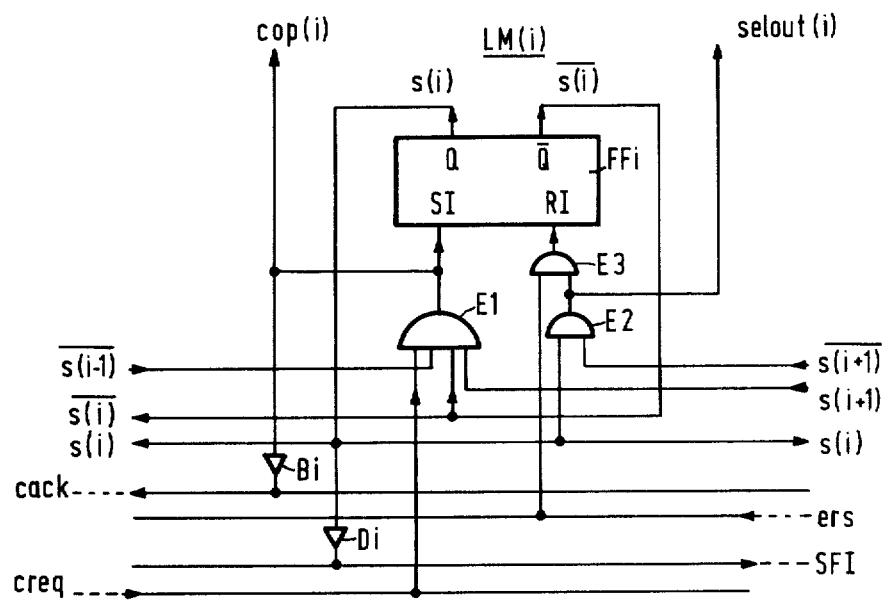
FIG. 7 shows a further embodiment of the logic means of a section (i) of the buffer memory.
Figure 8:
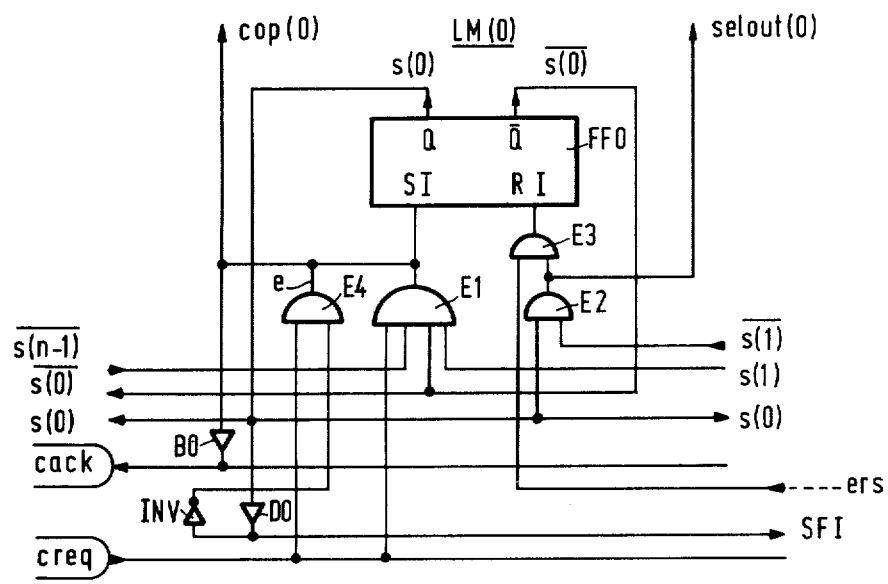
FIG. 8 shows an embodiment of the logic means, similar to FIG. 7, of a first section (j=0) of the buffer memory.

FIGS. 7 and 8 show a further embodiment of the logic means LM(i) and LM(0) of a section of the buffer memory. Therein, use is made of the already described edge-controlled flipflops (for example, 74LS76, Signetics). All signals used are correspondingly denoted in as far as they also occur in the embodiment shown in the FIGS. 2 and 5. FIG. 7 shows a flipflop FFi, AND-function gates E1, E2, E3, and drive circuits Di and Bi. The flipflop FFi has a set input SI and a reset input RI. In the AND-function gate E1, the condition $creq\cdot \overline{s(i-1)}\cdot \overline{s(i)}\cdot s(i+1)$ is monitored. If this condition is satisfied, cop(i)=1, so that REG(i) has been selected for the storage of data. Moreover, s(i):=1 via the input SI of FFi. In comparison with the embodiment shown in FIG. 5, the additional condition $\overline{s(i-1)}$ for generating cop(i) is taken into account in this embodiment. This is done to prevent complete filling of the buffer.

Thus, E1 is further extended (the extension is referred to hereinafter as logic means) for monitoring in this respect. Thus, there can never be problems as regards determination of an input location and an output location should the buffer be completely filled. In the embodiment shown in FIG. 5, this was not problematic, because the bistable elements FSi and FHi, controlled by two clock pulse phases, always permit a distinction in order to determine the input locations and output locations. In the AND-function gate E2 of FIG. 7, the signal selout(i)$=s(i)\cdot \overline{s(i+1)}$ is formed. In reaction to the signal "ers," the condition selout(i)· ers will then be satisfied in the AND-function gate E3. The flip-flop FFi is thus reset via the input RI: s(i):=0.

The line carrying the signal s(i) is connected to the signal line SFI via the drive circuit Di. Similarly, the line carrying the signal cop(i) is connected to the line "cack" via the drive circuit Bi. These lines supply, by way of an OR-function (wired-OR), the said signals "SFI" and "cack," respectively.

In order to be complete, FIG. 8 also shows the logic means LM(0) for a first section of the buffer in the case utilizing edges-controlled flipflops. FIG. 8 is identical to FIG. 7, be it that i=0.

The only difference consists in the presence of an inverter INV and an AND-function gate E4. These means are used to control the situation in which all registers of the buffer are empty (SFI=0). This is because in this case, in reaction to the signal "creq," the gate E4 supplies a signal e=1 which then serves as cop(0) whereby the selection of the input location for the first data arriving is realized. These data, therefore, are stored in the first section of the buffer in this case. It will be obvious that any other section can be selected for this purpose, but the first section seems to be the most obvious choice in practice.

Because the logic means are further identical for all sections, it will be obvious that the extension of the buffer is not at all problematic. In the case of cascade connection of a number of these solid state buffers, it is sufficient to interconnect a "creq" signal input of a next buffer to an SFI signal output of a preceding buffer, and to connect the signal input "ers" of a preceding buffer to a "cack" signal output of a subsequent buffer. The output bus OB is connected to the input bus IB of a subsequent buffer. It is to be noted, however, that in this case the delay time increases: for each added additional buffer, the delay time increases by one unit (the minimum delay time of a buffer is taken as one unit). When the buffer is extended by a number of buffers in order to obtain an arbitrary desired length, all signal lines may also be interconnected in order to maintain minimum delay time. However, the looped signal line bus should then be opened and be closed again across the total of all buffers.

Finally, it is to be noted that in this arrangement it must be ensured that in total only one AND-function gate E4 can be activated only one time in order to indicate where the input location is situated in the case of a completely empty buffer so that no ambiguity can arise.

What is claimed is:

1. A data buffer memory of the "first-in, first-out" type, having logic means for ensuring that an input for data to be written is situated as near as possible to an output for data to be read, depending on the filling of the buffer, thus forming an uninterrupted content of the buffer, furthermore having an input bus for transporting data to an input of a register of said buffer assigned for this purpose, and an output bus by which data are read from a register of said buffer assigned for this purpose, said logic means being provided for each section of the buffer having n registers (0, 1, ... n−1), said logic means further comprising:

first logic means for detecting a condition that a register (i) is empty and that the next register (i+1) is full, which detector condition is for controlling selection means to select (cop(i)) register (i) in which, furthermore controlled by a request signal (creq) from outside the buffer, data are taken up from the input bus;

second logic means for generating, on the basis of the longest filled state of a register (i), a signal (selout (i)) for the selection of that register (i) from which data are taken up by the output bus;

further logic means being provided for updating a status indication for register (i) determined by said signal and an acknowledge signal (ers) applied from outside the buffer indicating that the register (i) becomes empty;

third logic means generating a signal (e) indicating that all registers are empty (no signal cop (i) being generatable), said signal through still further logic means selecting a register (j).

2. A data buffer memory as claimed in claim 1, wherein said logic means for each section of the buffer further comprise two bistable memory elements which can be operated in a first and a second clock pulse phase, the first bistable elements serving for updating an auxiliary status h(i) of a register (i), while the second bistable elements serve for updating the status s(i) of a register (i), said elements also defining the signal selout-(i)=h(i)·s(i) which unambiguously selects the register (i) which qualifies to be read out to the output bus, said bistable elements ensuring, regardless of the fact whether or not the buffer is completely filled, that the status becomes h(i):=0 upon appearance of the signal selout(i) in a first clock pulse phase, provided that the condition s(i)·s(i+1) is satisfied, while in a second clock pulse phase the status becomes s(i):=(0 only if the condition h(i)·ers is satisfied.

3. A data buffer memory as claimed in claim 1, wherein:

said logic means and further logic means of each section generate the signal cop(i)=creq·s(i)·s(i+1) only if the condition s(i−1) is also satisfied, complete filling of the buffer thus being prevented; there being at least one empty register;

selout (i) appears, subject to the condition s(i)·s(i+1), which is, on the basis of the presence of at least one empty register, an unambiguous selection for the register (i) to be read out to the output bus, and that the signal selout(i)·ers appears as the signal whereby the status of the register (i) can be updated: s(i):=0 as register (i) becomes empty; in case all registers are empty, nevertheless a register (j) is selectable by cop(j)=creq·s(j−1)·s(j)·s(j+1)±e).

4. A data buffer memory as claimed in claim 1, wherein a signal "cack" can be generated, subject to the condition that (n−1/i=0) cop(i)=1, appearing if the signal cop(i) appears in one of the logic means, said signal being an acknowledgement to the outside of the buffer that data have been stored in one of the registers (i).

5. A data buffer memory as claimed in claim 1, wherein a status signal SFI=(n−1/i=0) s(i) appears on an output of the buffer to indicate that data are present in at least one of the registers of the buffer.

6. A data buffer memory as claimed in claim 1, wherein said buffer is constructed as a solid state integrated circuit.

7. A data buffer memory as claimed in claim 6, wherein the memory includes a plurality of sections and at least the relevant register and the associated logic means form a solid state integrated circuit for each section of the buffer.

8. A data buffer memory as claimed in claim 6, wherein the buffer includes at least one group of registers and at least one group of logic means for each section of the buffer, said groups being solid state integrated circuits.

* * * * *